(12) United States Patent
Yoshimatsu

(10) Patent No.: US 12,449,253 B2
(45) Date of Patent: Oct. 21, 2025

(54) TRAILER LENGTH ESTIMATION DEVICE AND TRAILER LENGTH ESTIMATION METHOD

(71) Applicant: TOYOTA JIDOSHA KABUSHIKI KAISHA, Aichi-ken (JP)

(72) Inventor: Akio Yoshimatsu, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 296 days.

(21) Appl. No.: 18/190,972

(22) Filed: Mar. 28, 2023

(65) Prior Publication Data

US 2023/0384086 A1  Nov. 30, 2023

(30) Foreign Application Priority Data

May 31, 2022  (JP) .................................. 2022-088595

(51) Int. Cl.
*G01B 21/22*  (2006.01)
(52) U.S. Cl.
CPC ................... *G01B 21/22* (2013.01)
(58) Field of Classification Search
CPC ...................................................... G01B 21/22
See application file for complete search history.

(56) References Cited

U.S. PATENT DOCUMENTS

| 2014/0267688 | A1* | 9/2014 | Aich | B60W 30/00 348/113 |
| 2014/0297128 | A1* | 10/2014 | Lavoie | B60W 30/18036 701/41 |
| 2016/0362135 | A1* | 12/2016 | Xu | B62D 13/06 |
| 2018/0109762 | A1* | 4/2018 | Aich | B62D 13/06 |

OTHER PUBLICATIONS

Ryo Torisu et al, "Equations of the Steering Characteristics of Multi-articulated Vehicles at Low Speeds", Journal of the Japanese Society of Agricultural Machinery, pp. 27-34, vol. 52, No. 5, 1990, 8pp.

* cited by examiner

*Primary Examiner* — Jamel E Williams
(74) *Attorney, Agent, or Firm* — HAUPTMAN HAM, LLP

(57) ABSTRACT

A trailer length estimation device for estimating, in a vehicle including a tractor and a trailer connected to the tractor by a connecting device, a trailer length from the connecting device to the wheels of the trailer includes: an acquisition unit that acquires a turning angle of a wheel of the tractor and a connection angle of the trailer with respect to the tractor, the turning angle being detected by a turning angle detector, and the connection angle being detected by a connection angle detector; and a derivation unit that derives the trailer length based on the acquired turning angle and the acquired connection angle when the vehicle is making a steady turn.

18 Claims, 5 Drawing Sheets

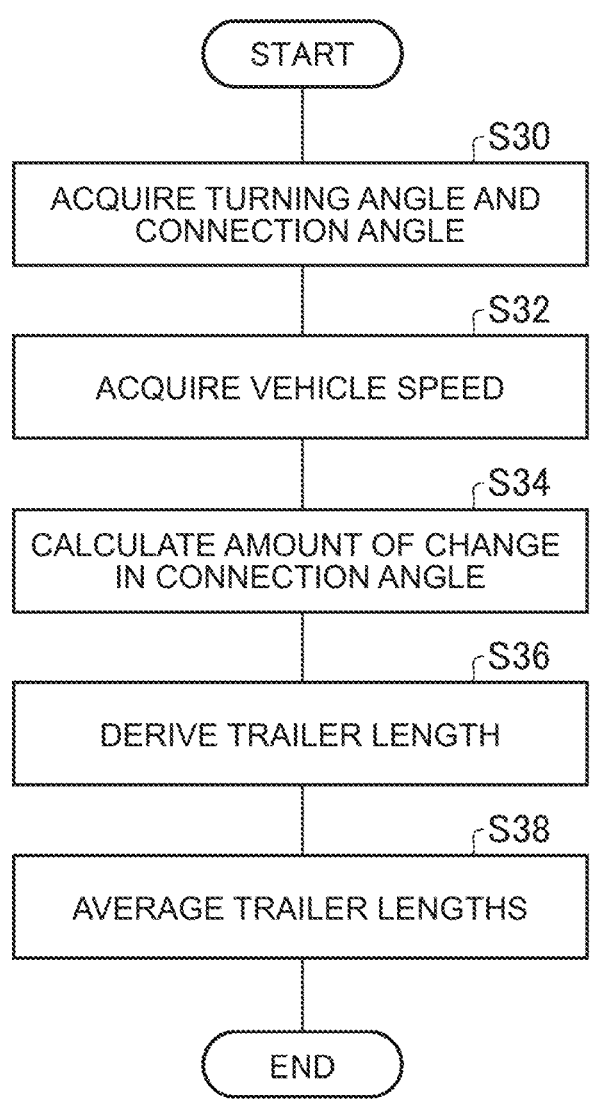

TRAILER LENGTH ESTIMATION DEVICE AND TRAILER LENGTH ESTIMATION METHOD

CROSS-REFERENCE TO RELATED APPLICATION

This application claims priority to Japanese Patent Application No. 2022-088595 filed on May 31, 2022, incorporated herein by reference in its entirety.

BACKGROUND

1. Technical Field

The disclosure relates to a technique for estimating, in a vehicle including a tractor and a trailer connected to the tractor by a connecting device, a trailer length from the connecting device to the wheels of the trailer.

2. Description of Related Art

US Unexamined Patent Application Publication No. 2016/0362135 (US 2016/0362135 A) discloses a backup assist system that includes a trailer sensor that generates a trailer yaw rate and a vehicle sensor system that generates a vehicle yaw rate and vehicle speed. The system determines an estimated length of a trailer based on an estimated hitch angle, the vehicle yaw rate, the vehicle speed, and the trailer yaw rate.

SUMMARY

In the technique described in US 2016/0362135 A, the trailer sensor that detects the trailer yaw rate is attached to the trailer.

An object of the present disclosure is to provide a technique for estimating a trailer length with a simple configuration.

In order to solve the above issue, one aspect of the present disclosure provides a trailer length estimation device configured to estimate, in a vehicle including a tractor and a trailer connected to the tractor by a connecting device, a trailer length from the connecting device to a wheel of the trailer. The trailer length estimation device includes: an acquisition unit configured to acquire a turning angle of a wheel of the tractor and a connection angle of the trailer with respect to the tractor, the turning angle being detected by a turning angle detector, and the connection angle being detected by a connection angle detector; and a derivation unit configured to derive the trailer length based on the acquired turning angle and the acquired connection angle when the vehicle is making a steady turn.

Another aspect of the present disclosure provides a trailer length estimation method performed by a trailer length estimation device configured to estimate, in a vehicle including a tractor and a trailer connected to the tractor by a connecting device, a trailer length from the connecting device to a wheel of the trailer. The trailer length estimation method includes: a step of acquiring a turning angle of a wheel of the tractor and a connection angle of the trailer with respect to the tractor; and a step of deriving the trailer length based on the acquired turning angle and the acquired connection angle when the vehicle is making a steady turn.

According to the present disclosure, it is possible to provide a technique for estimating the trailer length with a simple configuration.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a flowchart of a process for deriving the trailer length according to a modification.

DETAILED DESCRIPTION OF EMBODIMENTS

Figure 1:
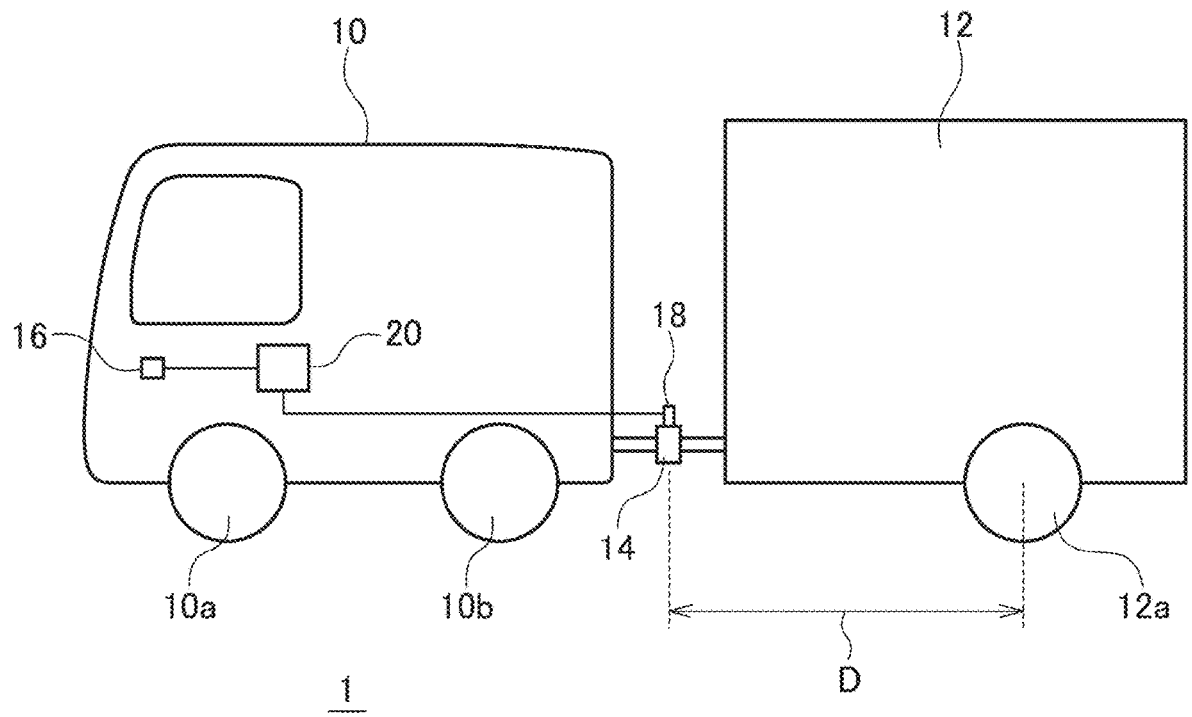
FIG. 1 is a diagram showing a configuration of a vehicle.

FIG. 1 is a diagram showing a configuration of a vehicle 1. The vehicle 1 includes a tractor 10, a trailer 12, a connecting device 14, a turning angle detection unit 16, a connection angle detection unit 18, and a trailer length estimation device 20.

The tractor 10 has a traveling power source and tows the trailer 12. The trailer 12 does not have a self-propelling function and is connected to the tractor 10 by the connecting device 14. The trailer 12 is able to be detached from the tractor 10 by disconnecting the connecting device 14. The trailer 12 has right and left wheels 12a.

The connecting device 14 is fixed to the tractor 10 and can be connected to the trailer 12. The connecting device 14 may be a coupler or a hitch member. The connecting device 14 enables the trailer 12 to rotate in the yaw direction relative to the tractor 10.

The turning angle detection unit 16 detects a turning angle of a front wheel 10a of the tractor 10. The turning angle detection unit 16 may be a steering angle sensor that is attached to a steering device and detects a steering angle or a steered angle. The connection angle detection unit 18 detects a connection angle of the trailer 12 with respect to the tractor in the yaw direction. The connection angle is also called a hitch angle. The connection angle detection unit 18 may be an angle sensor attached to the connecting device 14. Also, the connection angle detection unit 18 may be an in-vehicle camera and detect the connection angle by image analysis. The turning angle detection unit 16 and the connection angle detection unit 18 periodically transmit detection results to the trailer length estimation device 20.

The trailer length estimation device 20 estimates the trailer length D that is a length from a rotation axis of the connecting device 14 to the wheels 12a of the trailer, based on the turning angle detected by the turning angle detection unit 16 and the connection angle detected by the connection angle detection unit 18. As a result, it is possible to estimate the trailer length D with a simple configuration. When the trailer 12 is provided with a plurality of pairs of right and left wheels 12a, the distance from the center position of the wheels 12a to the rotation axis of the connecting device 14 is defined as the trailer length D.

Figure 2:
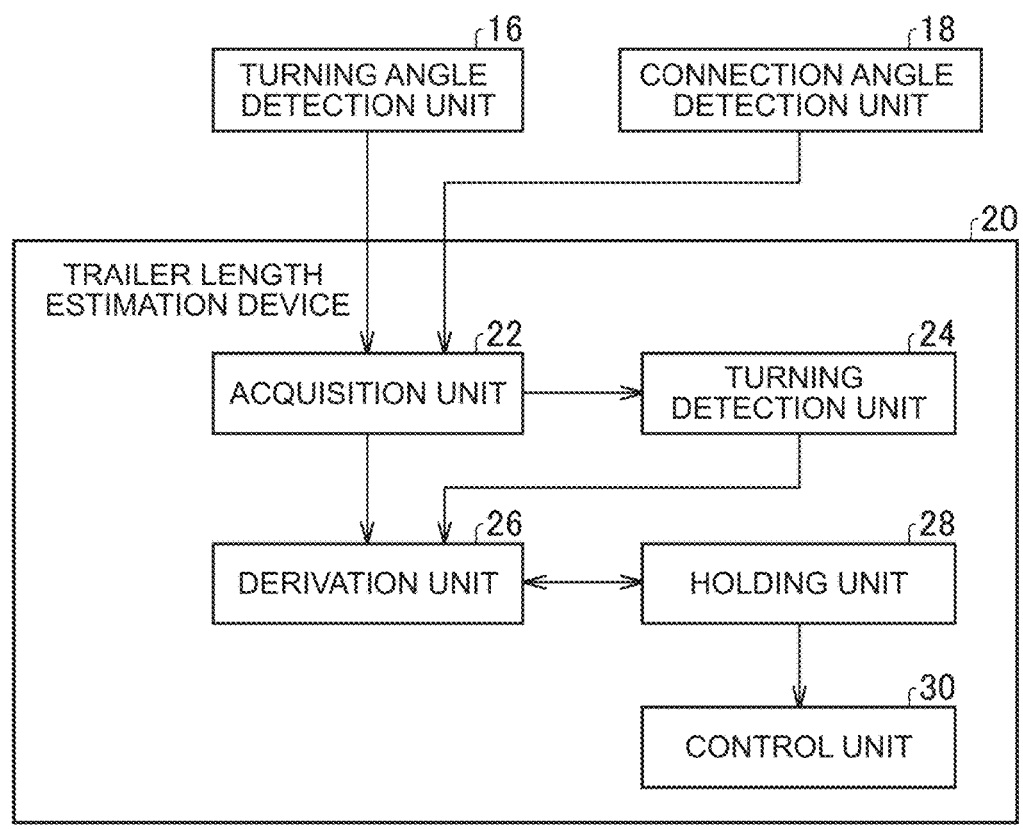
FIG. 2 is a diagram showing a functional configuration of a trailer length estimation device.

FIG. 2 illustrates a functional configuration of the trailer length estimation device 20. In FIG. 2, each element described as a functional block that performs various processes can be constituted by a circuit block, memory, or other large scale integrated circuits (LSIs) in terms of hardware, and is realized by a program or the like loaded in memory in terms of software. Therefore, those skilled in the art will understand that the functional blocks can be realized in various forms by hardware alone, software alone, or a combination thereof, and are not limited to one of them.

The trailer length estimation device 20 includes an acquisition unit 22, a turning detection unit 24, a derivation unit 26, a holding unit 28, and a control unit 30. The acquisition unit 22 acquires the turning angle of the front wheel 10a of the tractor 10 that is detected by the turning angle detection unit 16, and the connection angle of the trailer 12 with respect to the tractor 10 that is detected by the connection angle detection unit 18.

The turning detection unit 24 detects the turning state of the vehicle 1 and detects whether the vehicle 1 is making a steady turn. Making a steady turn refers to a state in which the vehicle 1 is turning at a constant turning angle. The turning detection unit 24 detects whether the vehicle 1 is making a steady turn based on the turning angle of the front wheel 10a and/or the connection angle of the trailer 12 with respect to the tractor 10. The turning detection unit 24 detects that the vehicle 1 is making a steady turn when an amount of change in the turning angle and/or the connection angle is zero or an approximate value thereof, and detects that the vehicle 1 is not making a steady turn when the amount of change in the turning angle and/or the connection angle is not zero or an approximate value thereof. In other words, when the amount of change in the turning angle and/or the connection angle is approximately zero, the turning detection unit 24 determines that the vehicle 1 is making a steady turn, since the vehicle 1 is turning at a constant steering angle. The amount of change in the turning angle and the connection angle is calculated, using the detection results that are periodically transmitted, by going back a plurality of times from the latest detection result. The turning detection unit 24 calculates the amount of change in the turning angle and the connection angle, for example, using the detection results of the most recent three times.

The derivation unit 26 derives the trailer length D based on the turning angle and the connection angle acquired by the acquisition unit 22 when the vehicle 1 is making a steady turn. Since the trailer length D is derived when the vehicle 1 is making a steady turn, the trailer length D can be derived with higher accuracy than when the trailer length D is derived when the vehicle 1 is making an unsteady turn. The control unit 30 performs autonomous driving control of the vehicle 1 using the derived trailer length D. Here, a method of deriving the trailer length D will be described with reference to new drawings.

Figure 3:
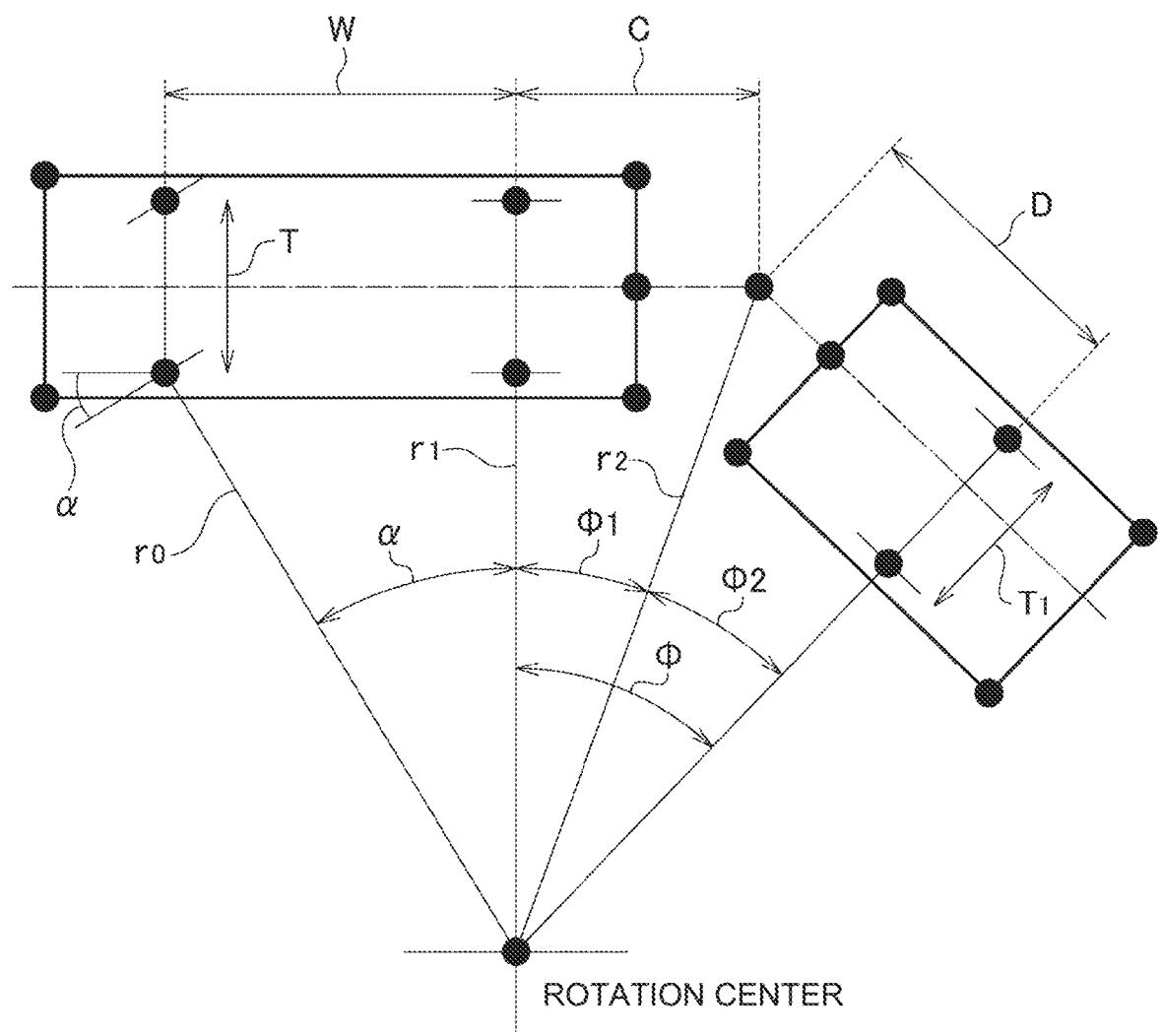
FIG. 3 is a diagram illustrating a method of deriving a trailer length from a turning angle and a connection angle.

FIG. 3 is a diagram illustrating a method of deriving the trailer length D from the turning angle α and the connection angle φ. The derivation unit 26 uses the wheel base W of the tractor 10, the width T between a pair of right and left front wheels 10a, the distance C from the rear wheels 10b of the tractor 10 to the connecting device 14, and the width $T_1$ between the right and left wheels 12a for derivation, and the specifications of the vehicle 1 are held in advance. Note that the distance C may be calculated based on an image captured by the in-vehicle camera.

The derivation unit 26 calculates the formulae (1) to (7) in this order to derive the trailer length D. The turning angle α is used in the formula (1), and the connection angle φ is used in the formula (5). In this way, the derivation unit 26 can derive the trailer length D by inputting the turning angle α and the connection angle φ into functions held in advance.

$r_0 = W/\sin \alpha$                                                       Formula (1)

$r_1 = r_0 \times \cos \alpha$                                              Formula (2)

$r_2 = \mathrm{SQRT}((r_1 + T/2)^2 + C^2)$                    Formula (3)

$\varphi 1 = \arctan(C/(r_1 + T/2))$                     Formula (4)

$\varphi 2 = \varphi - \varphi 1$                                                 Formula (5)

$\varphi 2 = \arcsin(D/r_2)$                                  Formula (6)

$D = \sin \varphi 2 \times r_2$                                      Formula (7)

Figure 4:
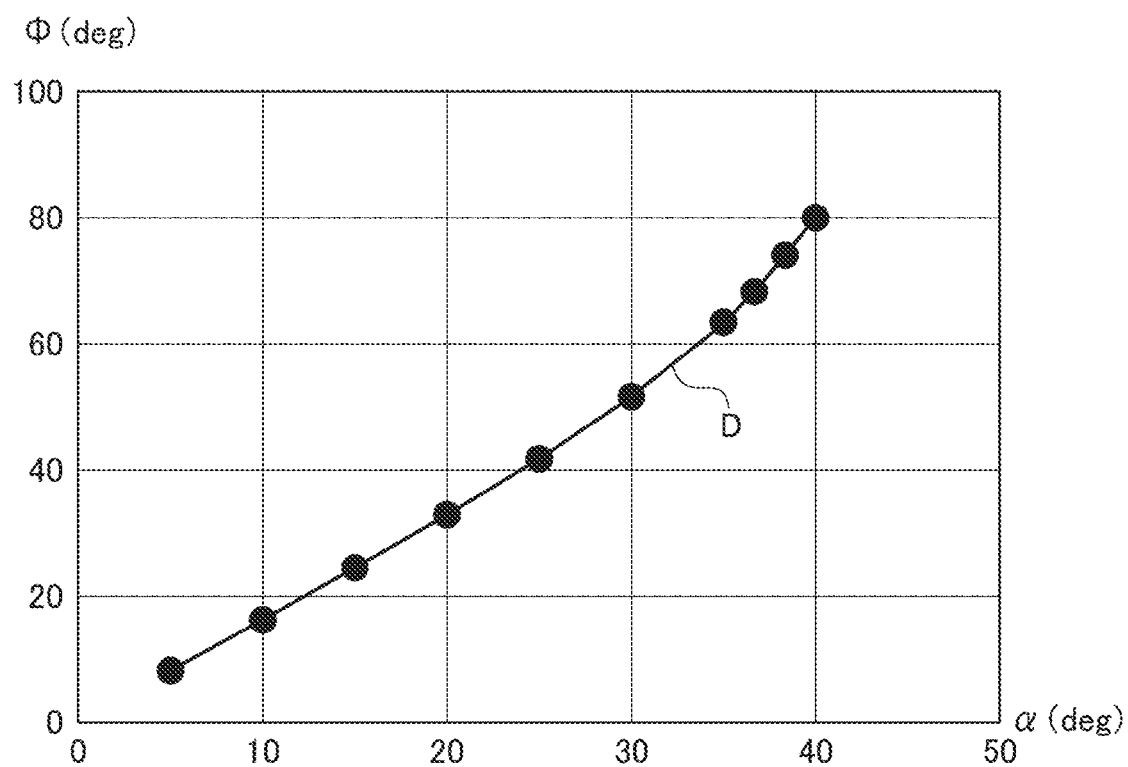
FIG. 4 is a diagram showing a relationship between the turning angle and the connection angle, and the trailer length.

FIG. 4 is a diagram showing a relationship between the turning angle α and the connection angle φ, and the trailer length D. The vertical axis in FIG. 4 indicates the connection angle φ, and the horizontal axis in FIG. 4 indicates the turning angle α. The ratio between the turning angle α and the connection angle φ when the vehicle is making a steady turn is uniquely determined by the trailer length D. Therefore, the derivation unit 26 derives the trailer length D using the map shown in FIG. 4. Thus, the derivation unit 26 may derive the trailer length D based on the functions, or may derive the trailer length D based on the map. In any case, the derivation unit 26 derives the trailer length D based on the turning angle α and the connection angle (p. The functions described in FIG. 3 and the map shown in FIG. 4 are held in the holding unit 28.

Returning to FIG. 2, the derivation unit 26 causes the holding unit 28 to hold the derived trailer length D. The derivation unit 26 discards the derived trailer length D in a case where the acquired turning angle α or the connection angle φ has changed by a value equal to or greater than a predetermined value when deriving the trailer length. For example, the derivation unit 26 reads the turning angle α or the connection angle φ immediately after deriving the trailer length D and calculates the amount of change in the turning angle α or the connection angle φ, and when the turning angle α or the connection angle φ has changed by a value equal to or greater than a predetermined value, discards the derived trailer length D. The derivation unit 26 does not discard the derived trailer length D and confirms it, when the turning angle α or the connection angle φ has not changed by a value equal to or greater than the predetermined value immediately after the derivation of the trailer length D. The trailer length D is discarded when it is determined that the vehicle 1 is not in a steady turning state immediately after the trailer length D is derived. In this way, in a case where the vehicle 1 is no longer in a steady turning state when deriving the trailer length D, the trailer length D is discarded, and the derivation accuracy of the trailer length D can be improved.

Further, the derivation unit 26 confirms the trailer length D without discarding it when the steady turning state is maintained within a predetermined period of time including the period during which the trailer length D is derived, and the derivation unit 26 discards the trailer length D when a value indicating that the vehicle is making a steady turn has changed by a value equal to or greater than the predetermined value within the predetermined period of time including the period during which the trailer length D is derived. The predetermined time is set to several seconds, for example, and may be set to two seconds by setting the time for deriving the trailer length D to one second and adding 0.5 seconds before and after that time.

When errors of a plurality of the derived trailer lengths D are within a predetermined threshold value, the derivation unit 26 may calculate the trailer length D by averaging those trailer lengths D. For example, the derivation unit 26 derives the trailer length D for each series of steady turns made by the vehicle and causes the holding unit 28 to hold the trailer length D, and then, when the errors of the trailer lengths D for three times are within a predetermined threshold value, calculates the trailer length D by averaging the trailer lengths D. The predetermined threshold value is set, for example, from three centimeters to 10 centimeters. As a result, the trailer length D can be derived with high accuracy.

The derivation unit 26 derives the trailer length D when the acquired turning angle α is equal to or greater than a predetermined reference turning angle, or the acquired connection angle φ is equal to or greater than a predetermined reference connection angle. For example, the reference turning angle is set to 10 degrees, and the reference connection angle is set to five degrees. As a result, the smallest steering angle at which determination of being in the steady turning state is made can be set. Also, by setting the reference turning angle to 10 degrees, the derivation is possible even at a gentle curve of a road, which increases the chances of derivation.

Figure 5:
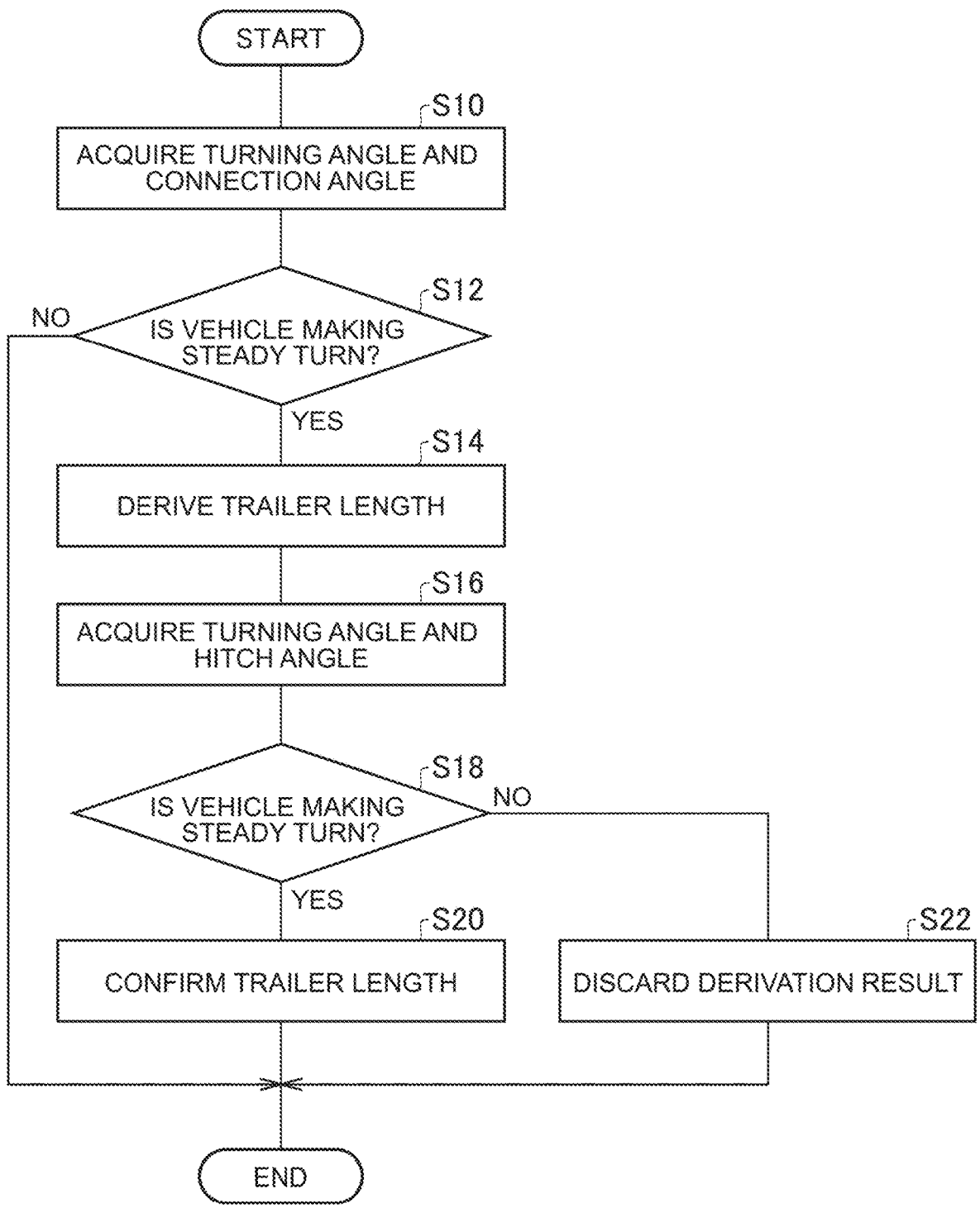
FIG. 5 is a flowchart of a process for deriving the trailer length.

FIG. 5 is a flowchart of a process for deriving the trailer length D. The acquisition unit 22 acquires the turning angle α and the connection angle φ (S10). The turning detection unit 24 determines whether the vehicle 1 is making a steady turn, based on the turning angle α and the connection angle φ (S12). When the vehicle 1 is not making a steady turn (N in S12), the derivation unit 26 does not derive the trailer length D, and the process ends.

When the vehicle 1 is making a steady turn (Y in S12), the derivation unit 26 derives the trailer length D based on the turning angle α and the connection angle φ (S14). After deriving the trailer length D, the acquisition unit 22 acquires a new turning angle α and a new connection angle φ (S16). The turning detection unit 24 determines whether the vehicle 1 is making a steady turn, based on the new turning angle α and the new connection angle φ (S18).

When the vehicle 1 is making a steady turn (Y in S18), the derivation unit 26 confirms the derived trailer length D as the trailer length D without discarding it (S20). When the vehicle 1 is not making a steady turn (N in S18), the derivation unit 26 discards the derivation result of the trailer length D (S22).

FIG. 6 is a flowchart of a process for deriving the trailer length D according to a modification. The derivation process shown in FIG. 6 differs from the derivation process shown in FIG. 5 in that the trailer length D is derived when the vehicle is making an unsteady turn, and not a steady turn. That is, in the modification, the derivation unit 26 derives the trailer length D based on the amount of change in the connection angle φ.

The acquisition unit 22 acquires the turning angle α and the connection angle φ (S30). Also, the acquisition unit 22 acquires the vehicle speed of the vehicle 1 (S32). The derivation unit 26 calculates the amount of change in the connection angle φ (S34), and derives the trailer length D based on the amount of change in the connection angle φ by a known method using the equation of motion (see Journal of the Japanese Society of Agricultural Machinery, Vol. 52, No. 5, 1990) (S36). Note that the derivation unit 26 may derive the trailer length D based on a map indicating the relationship between the turning angle α and the amount of change in the connection angle φ when the turning angle α is constant.

The derivation unit 26 calculates the trailer length D by averaging the derived trailer lengths D (S38). As a result, variations in the trailer length D derived for each time can be reduced.

It should be understood by those skilled in the art that the embodiments are merely examples, that various modifications can be made to the combination of each component, and that such modifications are within the scope of the present disclosure.

In the embodiment, a mode in which the vehicle 1 is provided with the trailer length estimation device 20 was shown, but the present disclosure is not limited to this mode. For example, the results detected by the sensors of the vehicle 1 may be transmitted to a server device, and the server device may derive the trailer length D based on the turning angle α and the connection angle φ and transmit it to the vehicle 1.

What is claimed is:

1. A trailer length estimation device configured to estimate, in a vehicle including a tractor and a trailer connected to the tractor by a connecting device, a trailer length from the connecting device to a wheel of the trailer, the trailer length estimation device comprising:
    an acquisition unit configured to acquire a turning angle of a wheel of the tractor, and a connection angle of the trailer with respect to the tractor, the turning angle being detected by a turning angle detector, and the connection angle being detected by a connection angle detector; and
    a derivation unit configured to:
        calculate an amount of change in the acquired connection angle, and
        derive the trailer length based on the acquired turning angle and the calculated amount of change in the acquired connection angle when the vehicle is making an unsteady turn.

2. The trailer length estimation device according to claim 1, wherein, in response to errors of a plurality of the derived trailer lengths falling within a predetermined threshold value, the derivation unit is configured to calculate the trailer length by averaging the plurality of the derived trailer lengths.

3. The trailer length estimation device according to claim 1, wherein the derivation unit is configured to derive the trailer length when the acquired turning angle is equal to or greater than a predetermined reference turning angle, or the acquired connection angle is equal to or greater than a predetermined reference connection angle.

4. A trailer length estimation method performed by a trailer length estimation device configured to estimate, in a vehicle including a tractor and a trailer connected to the tractor by a connecting device, a trailer length from the connecting device to a wheel of the trailer, the trailer length estimation method comprising:
    acquiring a turning angle of a wheel of the tractor, and a connection angle of the trailer with respect to the tractor, the turning angle being detected by a turning angle detector, and the connection angle being detected by a connection angle detector;
    calculating an amount of change in the acquired connection angle; and
    deriving the trailer length based on the acquired turning angle and the calculated amount of change in the acquired connection angle when the vehicle is making an unsteady turn.

5. The trailer length estimation method according to claim 4, further comprising in response to errors of a plurality of the derived trailer lengths falling within a predetermined threshold value, calculating the trailer length by averaging the plurality of the derived trailer lengths.

6. The trailer length estimation method according to claim 4, wherein
the deriving the trailer length is performed when the acquired turning angle is equal to or greater than a predetermined reference turning angle, or when the acquired connection angle is equal to or greater than a predetermined reference connection angle.

7. The trailer length estimation device according to claim 1, wherein
the derivation unit is further configured to derive the trailer length based on a map indicating a relationship between the turning angle and the amount of change in the connection angle when the turning angle is constant.

8. The trailer length estimation device according to claim 7, wherein
the acquisition unit is further configured to acquire a vehicle speed of the vehicle.

9. The trailer length estimation device according to claim 8, wherein
the derivation unit is configured to derive the trailer length in response to the acquired turning angle being equal to or greater than a predetermined reference turning angle.

10. The trailer length estimation device according to claim 9, wherein
in response to errors of a plurality of the derived trailer lengths falling within a predetermined threshold value, the derivation unit is configured to calculate the trailer length by averaging the plurality of the derived trailer lengths.

11. The trailer length estimation device according to claim 8, wherein
the derivation unit is configured to derive the trailer length in response to the acquired connection angle being equal to or greater than a predetermined reference connection angle.

12. The trailer length estimation device according to claim 11, wherein
in response to errors of a plurality of the derived trailer lengths falling within a predetermined threshold value, the derivation unit is configured to calculate the trailer length by averaging the plurality of the derived trailer lengths.

13. The trailer length estimation method according to claim 4, wherein
the deriving the trailer length is performed based on a map indicating a relationship between the turning angle and the amount of change in the connection angle when the turning angle is constant.

14. The trailer length estimation method according to claim 13, further comprising:
acquiring a vehicle speed of the vehicle.

15. The trailer length estimation method according to claim 14, wherein
the deriving the trailer length is performed in response to the acquired turning angle being equal to or greater than a predetermined reference turning angle.

16. The trailer length estimation method according to claim 15, further comprising:
in response to errors of a plurality of the derived trailer lengths falling within a predetermined threshold value, calculating the trailer length by averaging the plurality of the derived trailer lengths.

17. The trailer length estimation method according to claim 14, wherein
the deriving the trailer length is performed in response to the acquired connection angle being equal to or greater than a predetermined reference connection angle.

18. The trailer length estimation method according to claim 17, further comprising:
in response to errors of a plurality of the derived trailer lengths falling within a predetermined threshold value, calculating the trailer length by averaging the plurality of the derived trailer lengths.

* * * * *